(12) United States Patent
Ostrovsky et al.

(10) Patent No.: US 8,392,920 B2
(45) Date of Patent: Mar. 5, 2013

(54) PARALLEL QUERY ENGINE WITH DYNAMIC NUMBER OF WORKERS

(75) Inventors: Igor Ostrovsky, Bellevue, WA (US); John J. Duffy, Seattle, WA (US); Stephen Harris Toub, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 501 days.

(21) Appl. No.: 12/695,049

(22) Filed: Jan. 27, 2010

(65) Prior Publication Data
US 2011/0185358 A1    Jul. 28, 2011

(51) Int. Cl.
G06F 9/40    (2006.01)
G06F 9/44    (2006.01)
G06F 9/46    (2006.01)

(52) U.S. Cl. ........................................ 718/100; 718/102
(58) Field of Classification Search ..................... None
See application file for complete search history.

(56) References Cited

U.S. PATENT DOCUMENTS

| 6,041,384 | A | 3/2000 | Waddington |
| 6,289,334 | B1 | 9/2001 | Reiner |
| 6,480,876 | B2 | 11/2002 | Rehg |
| 2006/0218123 | A1 | 9/2006 | Chowdhuri |
| 2009/0031175 | A1 | 1/2009 | Aggarwal |
| 2009/0144346 | A1 | 6/2009 | Duffy |

FOREIGN PATENT DOCUMENTS
WO    WO 2008118613    * 10/2008

OTHER PUBLICATIONS

Author Unknown; Managing Parallel Query—Published Date: Mar. 2004 http://publib.boulder.ibm.com/infocenter/rbhelp/v6r3/index.jsp?topic=/com.ibm.redbrick.doc6.3/perf/perf33.htm (Copy Attached).
Author Unknown; Parallel Queries—Retrieved Date: Nov. 26, 2009 http://manuals.sybase.com/onlinebooks/group-as/asg1250e/sag/@Generic__BookTextView/15909;pt=15956 (Copy Attached).

* cited by examiner

Primary Examiner — Qing Wu
(74) Attorney, Agent, or Firm — Workman Nydegger

(57) ABSTRACT

Partitioning query execution work of a sequence including a plurality of elements. A method includes a worker core requesting work from a work queue. In response, the worker core receives a task from the work queue. The task is a replicable sequence-processing task including two distinct steps: scheduling a copy of the task on the scheduler queue and processing a sequence. The worker core processes the task by: creating a replica of the task and placing the replica of the task on the work queue, and beginning processing the sequence. The acts are repeated for one or more additional worker cores, where receiving a task from the work queue is performed by receiving one or more replicas of tasks placed on the task queue by earlier performances of creating a replica of the task and placing the replica of the task on the work queue by a different worker core.

20 Claims, 5 Drawing Sheets

PARALLEL QUERY ENGINE WITH DYNAMIC NUMBER OF WORKERS

BACKGROUND

Background and Relevant Art

Computers and computing systems have affected nearly every aspect of modern living. Computers are generally involved in work, recreation, healthcare, transportation, entertainment, household management, etc.

Recent advances in computing technology include the use of multiple processors or cores in a single machine. Often, the multiple cores may be implemented on the same semiconductor die or at least packaged in the same chip package. To effectively utilize the multi-core systems, programming techniques have been developed to split computing work between the cores. A data-parallel declarative programming model makes it easy for developers to build programs that execute on parallel systems such as multi-core machines or clusters. A data-parallel operation will typically split up the input sequence into some number of partitions and then process each partition on a single worker (i.e. a thread executing on a single core). Developers write programs in a data-parallel declarative programming model by combining operators (filters, projections, aggregations, etc) into queries. It is often difficult to determine how many workers should be created, because other computations may be happening on the machine at the same time.

In previous solutions, the intermediate data-parallel operation results are represented as a set of partitions. Each partition is a sequence that can be processed independently from other partitions, and thus different partitions can be processed on different computational cores. The input of each query operator is a fixed number of input partitions, and its output is the same fixed number of output partitions. The operator will typically wrap each input partition with a particular operation (e.g., a filtering operator will wrap each partition with a filtering operation, a mapping operator with a mapping operation, etc.)

In this model, the number of parallel workers is fixed for the duration of the data-parallel query evaluation, so computational resources on the machine may not be used optimally. The number of workers is by default equal to the number of processors on the machine. If one of the processors is busy at the time when the query is initiated, the processing of one partition will stall until a processor becomes available.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method that may be practiced in a computing environment including multiple processor cores. The method includes acts for partitioning query execution work of a sequence comprising a plurality of elements. The method includes: (a) a worker core requesting work from a work queue; (b) in response, the worker core receiving a task from the work queue (the task is a replicable sequence-processing task including two distinct steps: scheduling a copy of the task on the scheduler queue and processing a sequence); (c) the worker core processing the task by: creating a replica of the task and placing the replica of the task on the work queue, and beginning processing the sequence. Acts (a)-(c) are repeated for one or more additional worker cores. Act (b) for the one or more additional worker cores is performed by receiving one or more replicas of tasks placed on the task queue by an earlier performance of act (c) by a different worker core.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

FIG. A1 illustrates processing a lazy sequence in a multi-core system.

DETAILED DESCRIPTION

Embodiments may be implemented to execute a data-parallel query on a dynamic number of worker cores. A core is a piece of processor hardware that can run a single thread at any given instant. It may multitask by running several different threads, but at any given time, only a single thread has instructions being executed on the core. A worker thread is a sequential part of a program that executes on a single core. A program can include multiple threads that run concurrently with respect to each other. A task is a unit of work to be performed. Tasks to be done are held on a work queue. In the following examples, there are several threads whose role it is to pull tasks from the work queue and execute them The query evaluation begins with a single task that when executed by a worker core, schedules another task for another worker core, and the first worker core, as part of the task, begins executing the query. If and when another core becomes available, the second worker core executes the another task and schedules a third task, and helps the first worker execute the query. This can continue until the query is completed or all possible worker cores have been scheduled.

Some embodiments described herein include representation of intermediate query results that allows a dynamic number of workers (threads or cores). A scheme may be implemented for partitioning a single input stream into a dynamic number of streams. Data-parallel operations can be performed on a dynamic number of streams. A scheme may be implemented for merging a dynamic number of streams into a single output stream.

Figure 1A:
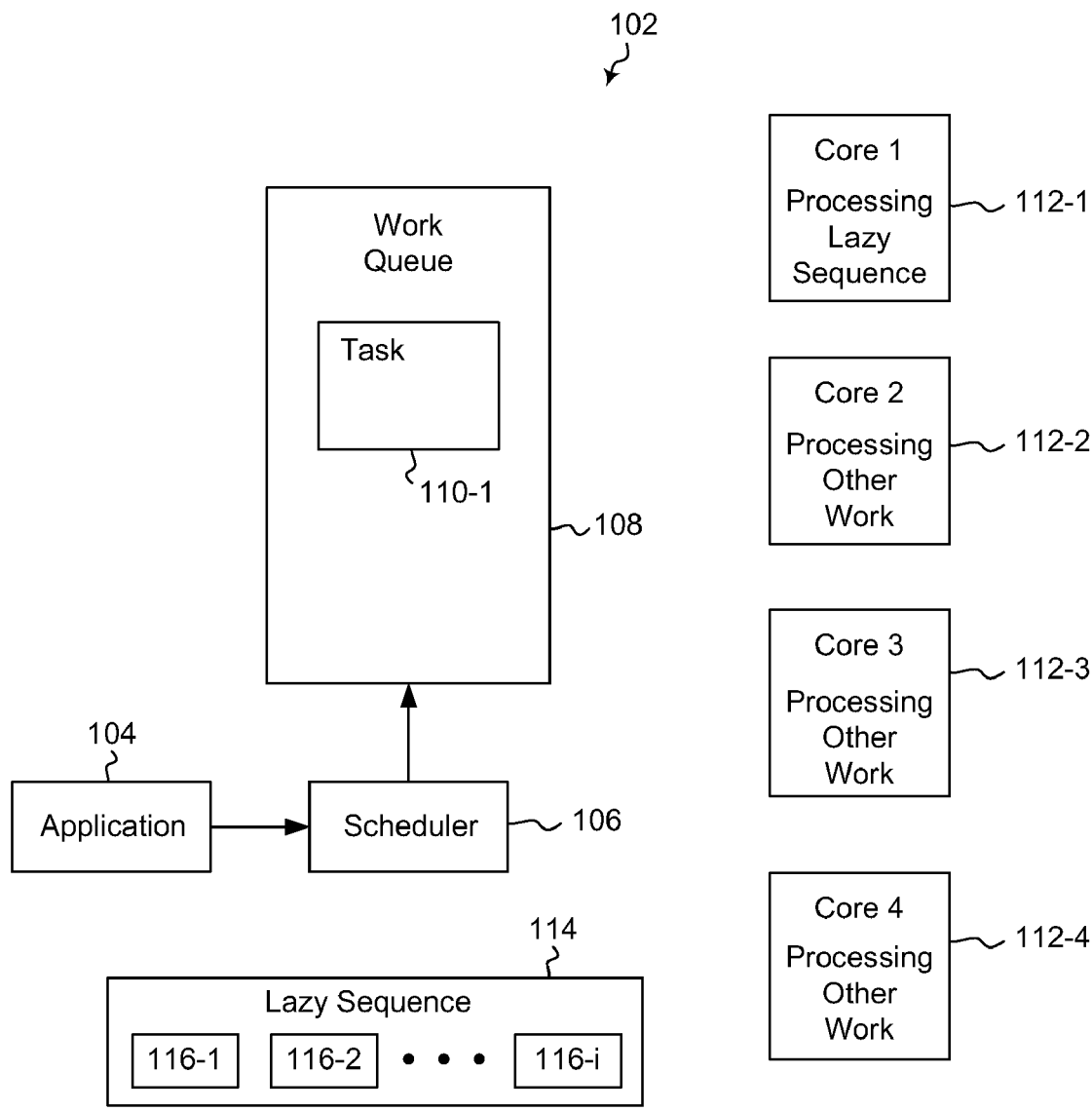
FIG. 1B illustrates processing a lazy sequence in a multi-core system.
FIG. 1C illustrates processing a lazy sequence in a multi-core system.

Referring to FIG. 1A, and as used herein, a lazy sequence 114 is a subroutine stored on a computer that represents a sequence where calling the subroutine the first time computes and returns the first element 116-1 of the sequence, calling the subroutine the second time returns the second element 116-2 of the sequence, calling the subroutine the i-th time returns the i-th element 116-$i$ of the sequence, etc. The subroutine returns a special signal instead of a value if it was called and there are no more elements in the sequence.

A lazy locked sequence is a lazy sequence protected by a lock, so that multiple threads can pull elements from the sequence. When a thread wants to remove an element from a lazy locked sequence, it performs these steps: acquire the lock on the lazy sequence (if the lock is held by another thread, wait until the lock is released); call the lazy sequence subroutine, and store the element returned; release the lock Often, it is useful to perform some expensive operation on each element in a (logical) sequence (that may be represented as a lazy sequence). Performing an expensive operation on each element is referred to herein as "processing" the sequence. Embodiments are implemented to process the sequence on multiple threads, so that the operation on different elements is executed on different threads. Furthermore, the embodiments may ensure that the number of threads used to process the sequence is automatically adjusted based on how busy the machine is.

Referring now to FIG. 1A, an example is illustrated. FIG. 1A illustrates generally a multi core system 102. Generally an application 104 will use a scheduler 106 to add tasks (referred to herein generally as 110 and specifically by 110 plus a suffix designator) to a work queue 108. A work queue is a data structure that stores units of work that need to be completed (i.e. 'tasks'). As noted above, an application 104 may add tasks, where each task can be obtained from the queue by a processor core, such as one of the processor cores 112-1, 112-2, 112-3, or 112-4 (which may be referred to herein generally as 112 and specifically by their suffix designator) of the multi core system 102. Each of the cores 112-1, 112-2, 112-3, or 112-4 can poll the queue 108 to find work when the cores 112 are idle or have completed other work. Embodiments herein may refer to work threads, where each worker thread runs on one computational hardware core 112 and continuously removes tasks 110 from the work queue 108 and executes them.

Embodiments may implement a replicable sequence-processing task so that a dynamic number of cores 112 can be assigned to process a sequence as the cores 112 become available. A replicable sequence-processing task is an efficient way to process a sequence 114 on parallel hardware. The hardware of the multi core system 102 may also be executing other operations. For example, some cores 112 may be processing a sequence 114 while other cores a performing other work. A replicable sequence-processing task is used to processes a lazy locked sequence by the sequence-processing task including two distinct steps: (1) scheduling a copy of itself on the scheduler queue; and (2) begin removing elements from the lazy locked sequence and processing them as explained previously in conjunction with the explanation of the lazy sequence subroutine.

Figure 1B:
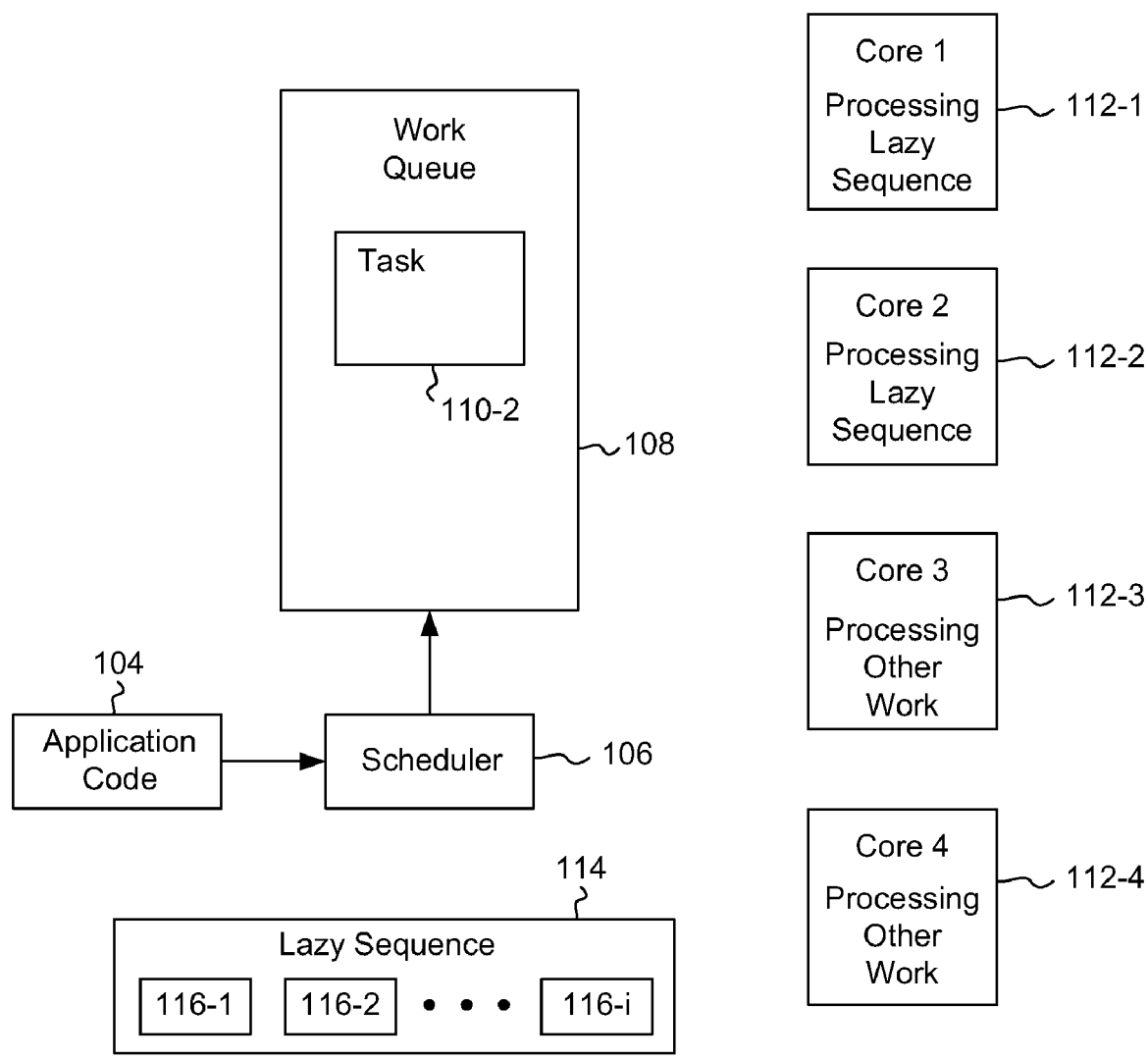

Illustrating now an example, assume that a first core 112-1 is the only core available to process the sequence 114. A task 110-1 is on the work queue and is a replicable sequence-processing task for processing the lazy sequence 114, such that it includes steps of (1) scheduling a copy of itself on the scheduler queue; and (2) begin removing elements from the lazy sequence 114 and processing them. When the first core 112-1 polls the work queue 108, the task 110-1 will be discovered. The first core 112-1 processing the task 110-1 causes the task 110-1 to be replicated as illustrated in FIG. 1B creating task 110-2. In particular, FIG. 1B illustrates a task 110-2 which is a replica of task 110-1 meaning that it includes steps of (1) scheduling a copy of itself on the scheduler queue; and (2) begin removing elements from the lazy sequence 114 and processing them. The first core 112-1 processing the task 110-1 also results in the first core 112-1 beginning to process elements of the sequence 114 using the subroutine as described above. Thus, if this is the first use of the subroutine, the first core 112-1 will begin processing element 116-1.

As illustrated in FIG. 1A, the other cores 112-2, 112-3, and 112-4 are each performing other work and are thus not available to participate in processing the sequence 114. However, FIG. 1B illustrates that the second core 112-2 may complete processing other work, and as a result polls the work queue 108 to discover new work. The second core 112-2 discovers the replicable sequence-processing task 110-2, which as noted above includes steps of (1) scheduling a copy of itself on the scheduler queue; and (2) begin removing elements from the lazy sequence 114 and processing them. The second core 112-2 processing the task 110-2 results in the creation of a replica of the task 110-2, illustrated as the replicable sequence-processing task 110-3 in FIG. 1C, and the second core 112-2 beginning to process the lazy sequence 114. In particular, the second core 112-2 will start processing the next element of the sequence after the last element of the sequence removed by the first core 112-1. Thus, if the first core is currently processing element 116-1, then the second core 112-2 will use the subroutine described above resulting the processing of the element 116-2.

Figure 1C:
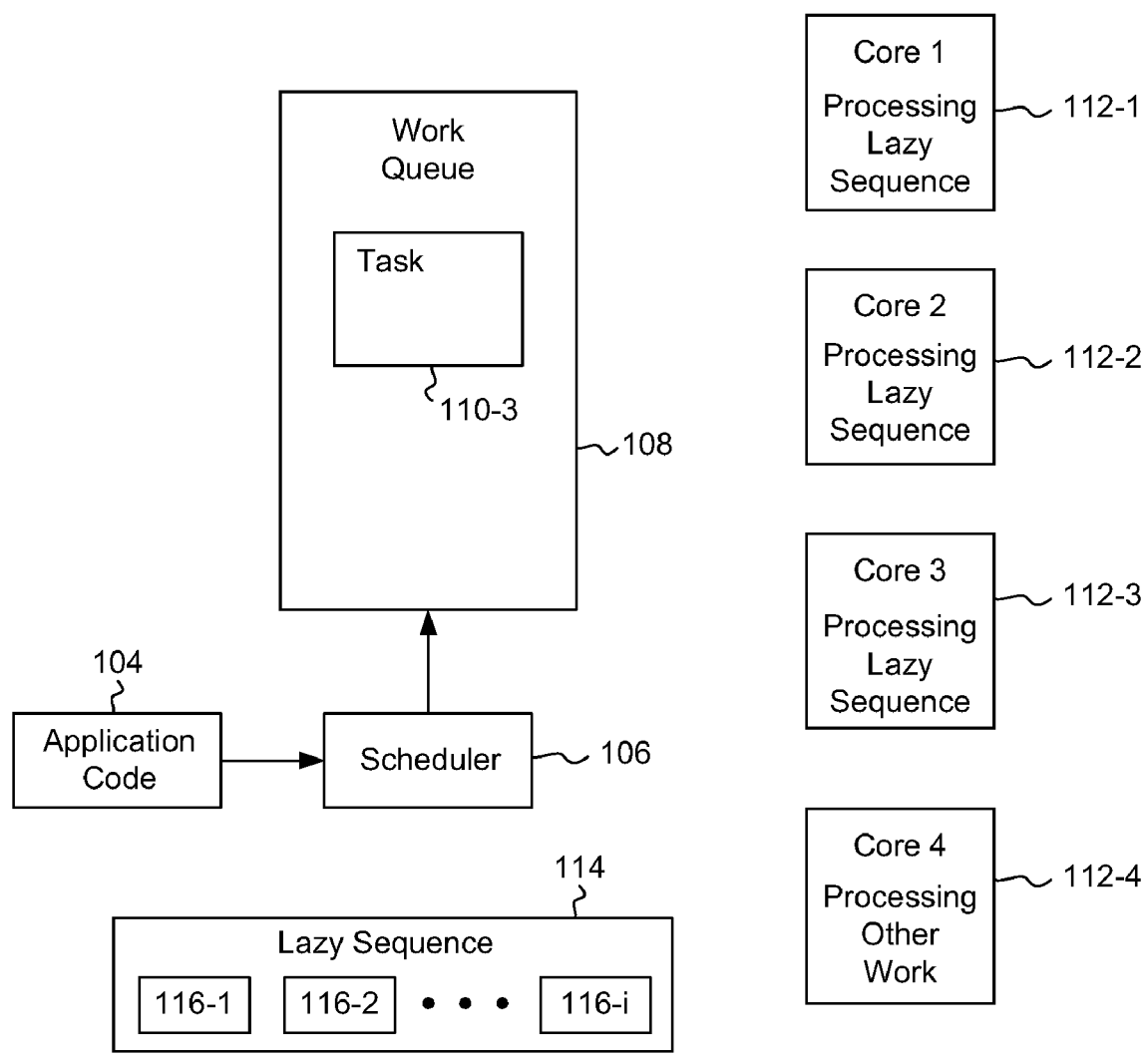

As illustrated in FIG. 1C, this process can be repeated as the third core 112-3 becomes idle and thus processes the task 110-3 resulting in a replica of the task 110-3 being added to the work queue 108 and the third core 112-3 beginning processing of elements on the lazy sequence 114. This can be continued until all possible cores are processing the lazy sequence and/or until the lazy sequence 114 has been fully processed, such as by all elements 116 having been processed and the special signal being returned. Any remaining replicable sequence-processing task on the work queue 108 can then be removed so that other tasks from the work queue 108 can be performed.

The results of performing the work by each of the cores 112 involved in processing the lazy sequence 114 are then merged to form a final result.

This design facilitates using an appropriate number of threads to process the sequence 114 (i.e., perform some computation for every element 116 in the sequence 114). If the machine is busy and only a single core 112 is available in the scheduler, that core will process entire sequence 114. If—on the other hand—more cores 112 become available while the sequence is getting processed, those cores 112 will join the sequence processing (by picking up one of the replica tasks 110 from the work queue 108).

Intermediate query results are represented as a partitioned set that can dynamically add more partitions at run time. In a typical work scheduler, multiple worker cores pull task descriptions from one or more work queues. Notably, embodiments may be implemented where multiple work queues 108 can be used the same set of cores to support tasks with different priorities, to group tasks to maximize locality, etc.

Further details and examples are now illustrated using C# code examples. the following is a representation of intermediate query results:

```
public interface IDynamicPartitions<T> {
    IEnumerator<T> GetPartition( );
}
```

An IDynamicPartitions<T> result set can be consumed by a dynamic number of worker cores. To add another worker core to the execution, GetPartition( ) is called, and the returned IEnumerator<T> is assigned to be consumed by that worker core. This constraint has impact on all parts of the query execution, such as that illustrated in FIG. 2:
1. Partitioning (202): IEnumerable<T>=>IDynamicPartitions<T>
2. Query operator implementation (204): IDynamicPartitions<T>=>IDynamicPartitions<U>
3. Merging (206): different variants, an example is IDynamicPartitions<T>=>IEnumerable<T>

Additional details are now illustrated for each of partitioning, query operator implementation and merging.

The partitioning act takes one sequence as an input 200, represented for example as an IEnumerable<T> or an array of T. For example, the array T may be the lazy sequence 114. The partitioning act will dynamically split up the sequence into multiple sequences as illustrated at partition input 202.

In one simple partitioning implementation, whenever a worker core (e.g. a core 112) is ready to process another element (e.g. an element 116), it takes a lock and removes one element from the input sequence. Inasmuch as elements are assigned to partitions on-demand rather than up-front, worker cores can be easily added throughout the computation.

Alternatively, the worker could remove an entire chunk of elements from the source each time it needs more work, thereby reducing synchronization overhead. For example, when locks are taken less frequently, synchronization overhead is reduces.

Figure 2:
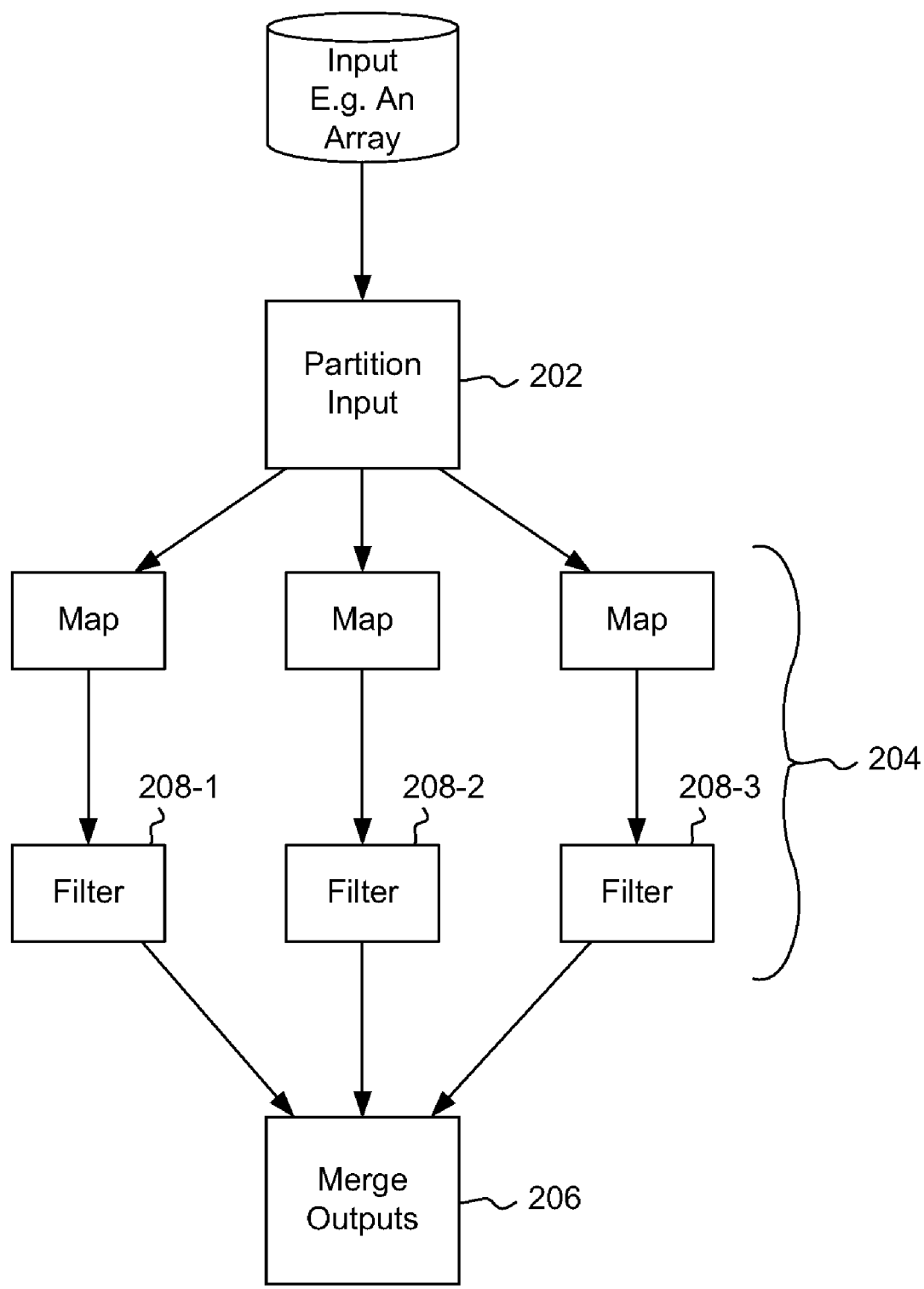
FIG. 2 illustrates a process flow for processing an input in a multi-core system.

Query operators are illustrated at 204 in FIG. 2. Different data-parallel operators also have to be implemented in a way that supports dynamically added worker cores.

For example, a filtering operation 208 would implement GetPartitions( ) as follows, in C#:

```
class FilteredPartitions<T> : IDynamicPartitions<T> {
    private IDynamicPartitions<T> inputPartitions = ...
    Func<T, bool> filterFunc = ...
    public IDynamicPartitions<T> GetPartition( ) {
        return new FilterPartition(inputPartitions.GetPartition( ));
    }
    private IEnumerator<T> FilterPartition(IEnumerator<T> inPartition) {
        while(true) {
            bool elementFound = false;
            while(elementFound = inPartition.MoveNext( ) &&
!filterFunc(inPartition.Current)) { }
            if (elementFound) { yield return inPartition.Current; }
            else { yield break; }
```

```
        }
    }
}
```

Each time FilteredPartitions<T>.GetPartition( ) is called, embodiments call GetPartitions( ) on the input partition, and wrap the input partition with a filter that only keeps results that match the filter.

Merging is illustrated at 206 in FIG. 2. As the last step of the data-parallel operation illustrated in FIG. 2, Embodiments merge the (dynamic number of) partitions into a single output sequence. The merge will call GetPartitions( ) to get an IDynamicPartitions<T> object that represents the results of the query. Then, the merge will hand out different partitions to different worker cores. Each worker core will enumerate its own partition, thereby executing its own share of work.

Various merge algorithms are possible. Embodiments are implemented where the merge supports dynamically added worker cores. In one simple merge algorithm that supports dynamically added workers, each worker core simply pulls elements from its partition, and inserts them into a single list as follows:

```
public static void MergeResults(IDynamicPartitions<T> partitions,
List<T> results)
{
    using(IEnumerator<T> myPartition = partitions.GetPartition( )) {
        while(myPartition.MoveNext( )) {
            T result = myPartition.Current;
            lock(results) {
                results.Add(result);
            }
        }
    }
}
```

The query can be executed in parallel as follows:

```
public static void RunQuery(IDynamicPartitions<T> partitions) {
    List<T> results = new List<T>( );
    Task task = TaskScheduler.ScheduleReplicatingTask(
        _ => MergeResults(partitions, results);
    )
    task.Wait( ); // waits for all replicas to complete
    return results;
}
```

This algorithm doesn't guarantee the order of the output elements. However, merge algorithms that do preserve ordering are also possible.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 3:
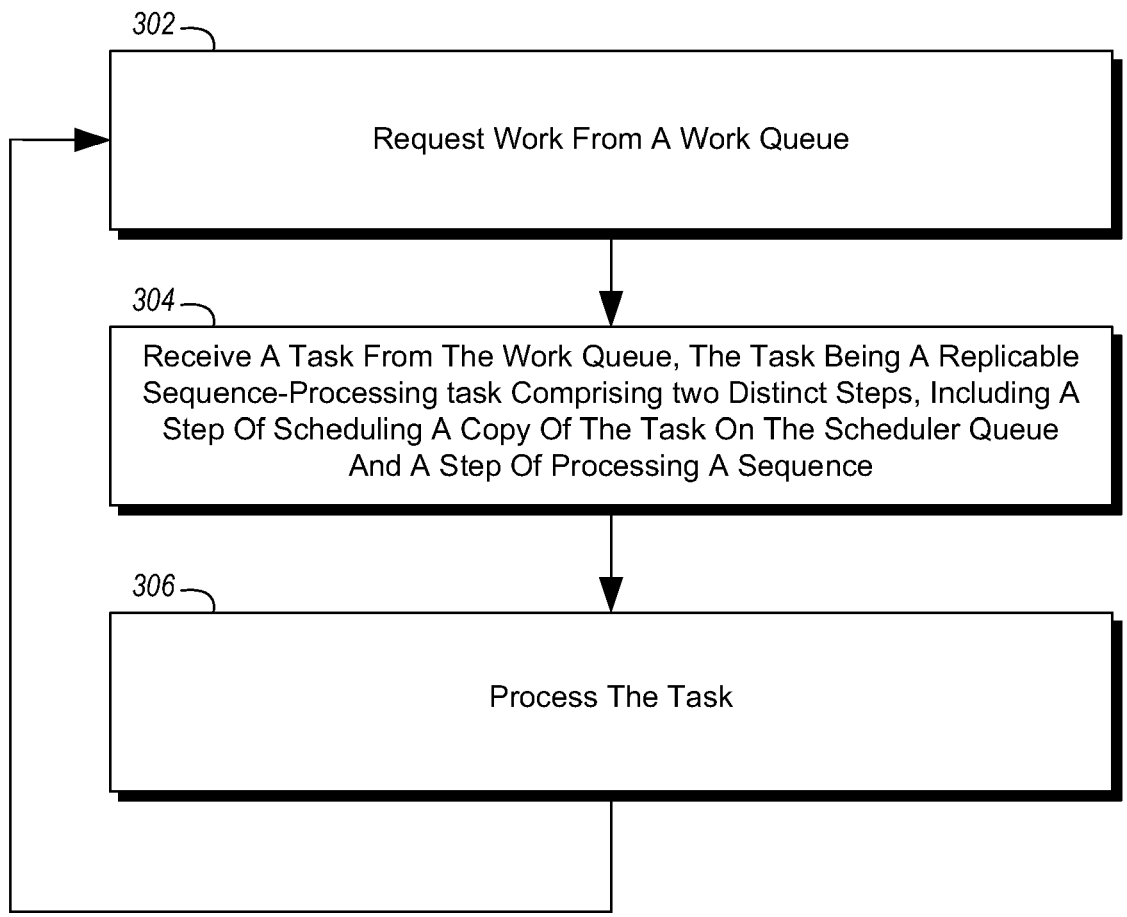
FIG. 3 illustrates a method of processing a sequence of work.

Referring now to FIG. 3, a method 300 is illustrated. The method 300 may be practiced in a computing environment including multiple processor cores, such as the system 102 illustrated in FIG. 1A. The method 300 includes acts for partitioning query execution work of a sequence including a plurality of elements. The method includes a worker core requesting work from a work queue (act 302). For example, a core 112 may request a task 110 from a work queue 108.

In response to the request, the worker core receives a task from the work queue (act 304). The task is a replicable sequence-processing task comprising two distinct steps, including a subtask of scheduling a copy of the task on the scheduler queue and a subtask of processing a sequence. The worker core processes the task (act 306). Processing the task may include creating a replica of the task and placing the replica of the task on the work queue and beginning processing the sequence. The replica of the task is a replicable sequence-processing task comprising two distinct steps, including a subtask of scheduling a copy of the replica of the task on the scheduler queue and a subtask of processing a sequence.

As illustrated in FIG. 3, acts 302-306 are repeated by one or more additional worker cores. Act 304 for the one or more additional worker cores is performed by receiving one or more replicas of tasks placed on the task queue by an earlier performance of act 306 by a different worker core. For example, when the method 300 is performed by processor 112-2, it will receive a task 110-2 placed onto the work queue by the processor 112-1 as a result of processor 112-1 processing the task 110-1.

The method 300 may be practiced where beginning processing the sequence includes requesting and processing a single element of the sequence not already processed or being processed by another worker core. For example, only a single element 116 may be processed at a given time by a processor. Alternatively, the method 300 may be practiced where beginning processing the sequence includes requesting and processing a predetermined number of element of the sequence not already processed or being processed by another worker core. For example, multiple elements 116 may be processed. This may be done so as to reduce synchronization overhead.

The method 300 may be practiced where the sequence is a lazy sequence, or where the sequence is a lazy locked sequence.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage or non-transitory media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment comprising multiple processor cores a method of partitioning query, execution work of a sequence comprising a plurality of elements, the method comprising:
 (a) a worker core requesting work from a work queue;
 (b) in response, the worker core receiving a task from the work queue, the task being a replicable sequence-processing task comprising two distinct steps, including a subtask of scheduling a copy of the task on the work queue and a subtask of processing a sequence;
 (c) the worker core processing the task by:
 creating a replica of the task and placing the replica of the task on the work queue, wherein the replica of the task is a replicable sequence-processing task comprising two distinct steps, including a subtask of scheduling a copy of the replica of the task on the work queue and a subtask of processing a sequence; and beginning processing the sequence; and (d) repeating acts (a)-(c) for one or more additional worker cores, wherein act (b) for the one or more additional worker cores is performed by receiving one or more replicas of tasks placed on the task queue by earlier performance of act (c) by one or more different worker cores.

2. The method of claim 1, wherein beginning processing the sequence comprises requesting and processing a single element of the sequence not already processed or being processed by another worker core.

3. The method of claim 1, wherein beginning processing the sequence comprises requesting and processing a predetermined number of element of the sequence so as to reduce synchronization overhead, the elements not already processed or being processed by another worker core.

4. The method of claim 1, wherein the sequence is a lazy sequence.

5. The method of claim 1, wherein the sequence is a lazy locked sequence.

6. The method of claim 1, further comprising merging results of processing the sequence by the worker cores.

7. The method of claim 6, wherein merging the results comprises merging the results in a fashion that preserves ordering of sequence elements.

8. In a computing environment a system for partitioning query execution work of a sequence comprising a plurality of elements, the system comprising:

a plurality of processor cores;

computer memory coupled to the plurality of processor cores, wherein the computer memory comprises computer executable instructions that when executed by one or more of the plurality of processor cores, causes the following:

(a) a worker core requesting work from a work queue;

(b) in response, the worker core receiving a task from the work queue, the task being a replicable sequence-processing task comprising two distinct steps, including a subtask of scheduling a copy of the task on the work queue and a subtask of processing a sequence;

(c) the worker core processing the task by:

creating a replica of the task and placing the replica of the task on the work queue, wherein the replica of the task is a replicable sequence-processing task comprising two distinct steps, including a subtask of scheduling a copy of the replica of the task on the work queue and a subtask of processing a sequence; and beginning processing the sequence; and (d) repeating acts (a)-(c) for one or more additional worker cores, wherein act (b) for the one or more additional worker cores is performed by receiving one or more replicas of tasks placed on the task queue by earlier performance of act (c) by one or more different worker cores.

9. The system of claim 8, wherein beginning processing the sequence comprises requesting and processing a single element of the sequence not already processed or being processed by another worker core.

10. The system of claim 8, wherein beginning processing the sequence comprises requesting and processing a predetermined number of element of the sequence so as to reduce synchronization overhead, the elements not already processed or being processed by another worker core.

11. The system of claim 8, wherein the sequence is a lazy sequence.

12. The system of claim 8, wherein the sequence is a lazy locked sequence.

13. The system of claim 8, further comprising merging results of processing the sequence by the worker cores.

14. The system of claim 13, wherein merging the results comprises merging the results in a fashion that preserves ordering of sequence elements.

15. In a computing environment comprising multiple processor cores, a physical non-transitory computer readable medium comprising computer executable instructions stored on the physical non-transitory computer readable medium that when executed by one or more computer processor cores cause the one or more processor cores to perform the following:

(a) a worker core requesting work from a work queue;

(b) in response, the worker core receiving a task from the work queue, the task being a replicable sequence-processing task comprising two distinct steps, including a subtask of scheduling a copy of the task on the work queue and a subtask of processing a sequence;

(c) the worker core processing the task by:

creating a replica of the task and placing the replica of the task on the work queue, wherein the replica of the task is a replicable sequence-processing task comprising two distinct steps, including a subtask of scheduling a copy of the replica of the task on the work queue and a subtask of processing a sequence; and beginning processing the sequence by processing one or more elements of the sequence by calling a subroutine that returns one or more of the elements of the sequence, where subsequent calls of the subroutine return one or more next logical elements of the sequence that have not already been returned in response to calling the subroutine;

(d) repeating acts (a)-(c) for one or more additional worker cores, wherein act (b) for the one or more additional worker cores is performed by receiving one or more replicas of tasks placed on the task queue by an earlier performance of act (c) by one or more different worker core and wherein act (c) is performed by the one or more additional cores by calling the subroutine so as to receive elements of the sequence that are to be the next logically processed elements that have not already been processed; and merging results of processing the sequence by the worker cores.

16. The computer readable medium of claim 15, wherein beginning processing the sequence comprises requesting and processing a single element of the sequence not already processed or being processed by another worker core.

17. The computer readable medium of claim 15, wherein beginning processing the sequence comprises requesting and processing a predetermined number of element of the sequence so as to reduce synchronization overhead, the elements not already processed or being processed by another worker core.

18. The computer readable medium of claim 15, wherein the sequence is a lazy sequence.

19. The computer readable medium of claim 15, wherein the sequence is a lazy locked sequence.

20. The computer readable medium of claim 15, wherein merging the results comprises merging the results in a fashion that preserves ordering of sequence elements.

* * * * *